United States Patent
Karten et al.

(10) Patent No.: US 6,289,968 B1
(45) Date of Patent: *Sep. 18, 2001

(54) FOLDABLE VEHICLE SUNSHADE

(75) Inventors: Stuart Karten, Venice; Paul Kirley, Santa Monica; Eric Olson, Venice, all of CA (US)

(73) Assignee: Quaker State Investment Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,740

(22) Filed: Jun. 15, 1998

(51) Int. Cl.$^7$ ...................................................... B60J 1/20
(52) U.S. Cl. ................................ 160/370.23; 160/370.21; 296/97.6; 296/97.7; 296/136
(58) Field of Search .................. 160/370.21, 370.23; 296/97.1, 97.6, 97.7, 97.8

(56) References Cited

U.S. PATENT DOCUMENTS

| | | |
|---|---|---|
| D. 237,663 | 11/1975 | Levy . |
| D. 314,934 | 2/1991 | Howes ................................ D12/155 |
| 2,624,406 * | 1/1953 | Szychowski et al. .......... 160/370.21 |
| 2,806,809 | 9/1957 | Schuh ..................................... 154/46 |
| 4,005,899 * | 2/1977 | Rigney ................................... 296/97 |
| 4,057,287 * | 11/1977 | Lilja .................................. 296/97 K |
| 4,202,396 | 5/1980 | Levy ..................................... 160/107 |
| 4,626,019 * | 12/1986 | Tung et al. ......................... 296/97 H |
| 4,657,298 * | 4/1987 | Yong O ................................. 296/136 |
| 4,763,454 * | 8/1988 | Brockhaus .................. 160/370.21 X |
| 4,838,334 * | 6/1989 | Hogg et al. ...................... 160/370.23 |
| 4,848,825 | 7/1989 | Niernberger ......................... 296/95.1 |
| 4,923,703 * | 5/1990 | Antoon, Jr. .......................... 426/118 |
| 4,942,993 * | 7/1990 | Delgado ................................ 224/275 |
| 4,958,880 | 9/1990 | Champane ............................ 296/97.7 |
| 4,978,181 * | 12/1990 | Inanuma et al. ...................... 350/1.7 |
| 5,004,285 | 4/1991 | Bennett ................................. 296/1.1 |
| 5,024,262 | 6/1991 | Huang ............................... 160/370.2 |
| 5,165,748 | 11/1992 | O'Connor ........................... 296/97.6 |
| 5,211,438 * | 5/1993 | Snow .................................. 296/95.1 |
| 5,267,599 * | 12/1993 | Kim .................................. 160/370.2 |
| 5,314,226 | 5/1994 | Tovar .................................. 296/97.7 |
| 5,343,915 * | 9/1994 | Newsome ........................ 296/136 X |
| 5,423,449 * | 6/1995 | Gordon et al. ........................ 220/410 |
| 5,466,505 * | 11/1995 | Fukuda et al. .......................... 428/91 |
| 5,615,923 * | 4/1997 | Madison ...................... 160/370.21 X |
| 5,649,584 * | 7/1997 | Leubecker ....................... 160/370.23 |
| 5,727,250 * | 3/1998 | Black ........................................ 2/10 |
| 5,728,632 * | 3/1998 | Sugie ......................... 160/370.21 X |
| 5,971,099 * | 10/1999 | Yasuda et al. ....................... 181/286 |
| 6,004,415 * | 12/1999 | Ko ............................... 160/370.22 X |

FOREIGN PATENT DOCUMENTS

| | | |
|---|---|---|
| 35113 | 8/1975 | (AU) . |
| 2630997 | 1/1988 | (FR) . |
| 859268 | 1/1961 | (GB) . |
| 5668 | 6/1973 | (IL) . |
| 5669 | 6/1973 | (IL) . |
| 5673 | 6/1973 | (IL) . |
| 5676 | 7/1973 | (IL) . |
| 1140475 | 6/1963 | (NL) . |
| 745006 | 8/1974 | (ZA) . |

* cited by examiner

*Primary Examiner*—Bruce A. Lev
(74) *Attorney, Agent, or Firm*—Jenkens & Gilchrist

(57) ABSTRACT

A foldable vehicle sunshade has a core of flexible, resilient material, with a plurality of folds defined by lines of stitching that extend from one edge of the sunshade to another edge of the sunshade.

15 Claims, 4 Drawing Sheets

FOLDABLE VEHICLE SUNSHADE

BACKGROUND OF THE INVENTION

The invention relates to collapsible sun shades for protecting the interior of automobiles against unwanted exposure to the sun. The sun shades of the present invention may be extended behind the windshield or windows of an automobile to act as a barrier to sunlight, reducing heat buildup within the vehicle interior and undesired weathering of the vehicle interior from exposure to sunlight.

In general, vehicle sun shades may be positioned to shield a vehicle interior from either an interior or exterior location. As an example, interior sun shades include folding cardboard sun shades for placement behind vehicle windshields such as shown in the patent to Levy, U.S. Pat. No. 4,202,396. Other types of interior windshield sun shades include fan-like venetian blind arrangements, and designs consisting of fabric supported by elongated loops of spring-like material.

In addition to the interior sun shades, exterior sun shades may also be used. For example, an exterior sun shade may consist of a thin layer of fabric or plastic to lie on the exterior surface of the windshield.

SUMMARY OF THE INVENTION

In general, in one aspect, the invention includes vehicle sunshades including a polymeric core material, a fabric covering, a series of stitches defining foldable panels, and a hinged margin around the periphery of the sun sunshade.

In general, in another aspect, the invention includes foldable vehicle sunshades including a polymeric core material, such as low or high density polyethylene or polyurethane foam, a polyethylene-terephalate coating on one side, a polyurethane coated nylon covering on another side, a series of stitches defining foldable panels, and a hinged margin around the periphery of the sunshade.

In general, in another aspect, the invention includes foldable vehicle sunshades including a polymeric core material, such as low or high density polyethylene or polyurethane foam, a nylon covering on at least one side of the polymeric core material, a series os stitches defining foldable panels, and a hinged margin around the periphery of the sunshade.

In general, in another aspect, the invention includes foldable vehicle sunshades including a polymeric core material, such as low or high density polyethylene or polyurethane foam, a polyethylene terephalate surface material on at least one side of the polymer core material, a series of stitches defining foldable panels, and a hinged margin around the periphery of the sunshade.

In general, sunshades under the present invention may be extended to form an open, or unfolded, state and may be folded to form a closed, or folded, state. Flexibility and resiliency in the materials selected to form the foldable sun shade provide a sun shade that is biased in an unfolded state, but that can also be folded to a folded state. A trimming material may be included around the periphery of the sunshade to prevent delamination of the surface material from the core material. Furthermore, the sunshades under the present invention include a restraining strap to maintain the sunshades in the closed, or folded, state.

DESCRIPTION OF THE PREFERRED EMBODIMENTS

The improved vehicle sunshade of the present invention is foldable, having a series of foldably joined panels preferably defined by lines of stitching which outline foldable panels that enable the sunshade to be folded and closed for storage, and opened, in an extended position for use in the windshield of a vehicle. Embodiments of the present invention may be light weight, easily stored, and durable.

In one possible embodiment of the present invention, a resilient polyethylene foam is used as the core material of the sun shade to insulate against heat and light radiation. In other embodiments, the core material may be made from other flexible, resilient materials, including rubber or flexible polymers which insulate against heat and light radiation.

Surface materials affixed onto the polymer core may include natural and synthetic fabrics, metallic fabrics and foils, and paper fabrics and sheets. Natural and synthetic fabrics that may be used as surface materials include cotton, silk, polyester, rayon, taffeta, nylon. Metallic fabrics and foils that may be used include aluminum foil, polyester mylar. Paper fabrics and sheets that may be used include cardboard. In other embodiments, the surface material may be treated with a silver coloring or coating suitable for reflecting sun light. These surface materials may be affixed onto the polymer core by stitching, gluing, or laminating, or a combination thereof.

In additional possible embodiments, a nylon fabric or a polyethylene-terephthalate (PET) film surface material is laminated onto a surface of the core material. In another possible embodiment, a fabric surface material may be coated with polyurethane and laminated onto a surface of the core material. The surface material may also include other materials, including materials suitable for insulating and reflecting light and heat radiation.

Figure 1:
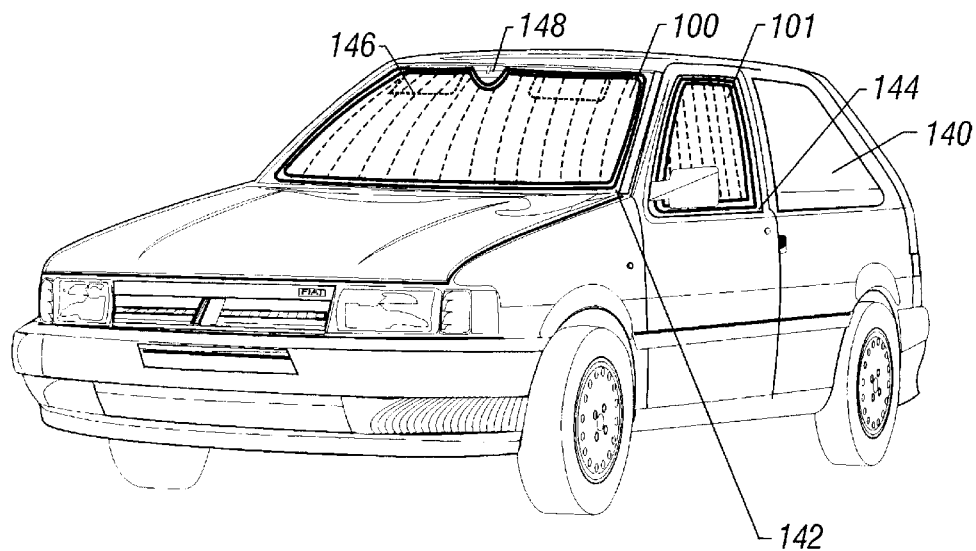
FIG. 1 is a perspective view of a vehicle sunshade in an open position beneath a vehicle windshield.

Referring to FIG. 1, a perspective view is shown of a foldable sun shade 100 of the present invention that is in an extended position in a vehicle interior 140 behind a vehicle windshield 142. In other embodiments, a sun shade 101 may be sized to also fit a vehicle window 144. In FIG. 1, the sun shade 100 is positioned to rest upon the rear-view mirror 148 to hold the sun shade 100 in place. The vehicle sun visors 146 may also be pivoted (not shown) to hold the sunshade 100 in place.

Figure 2:
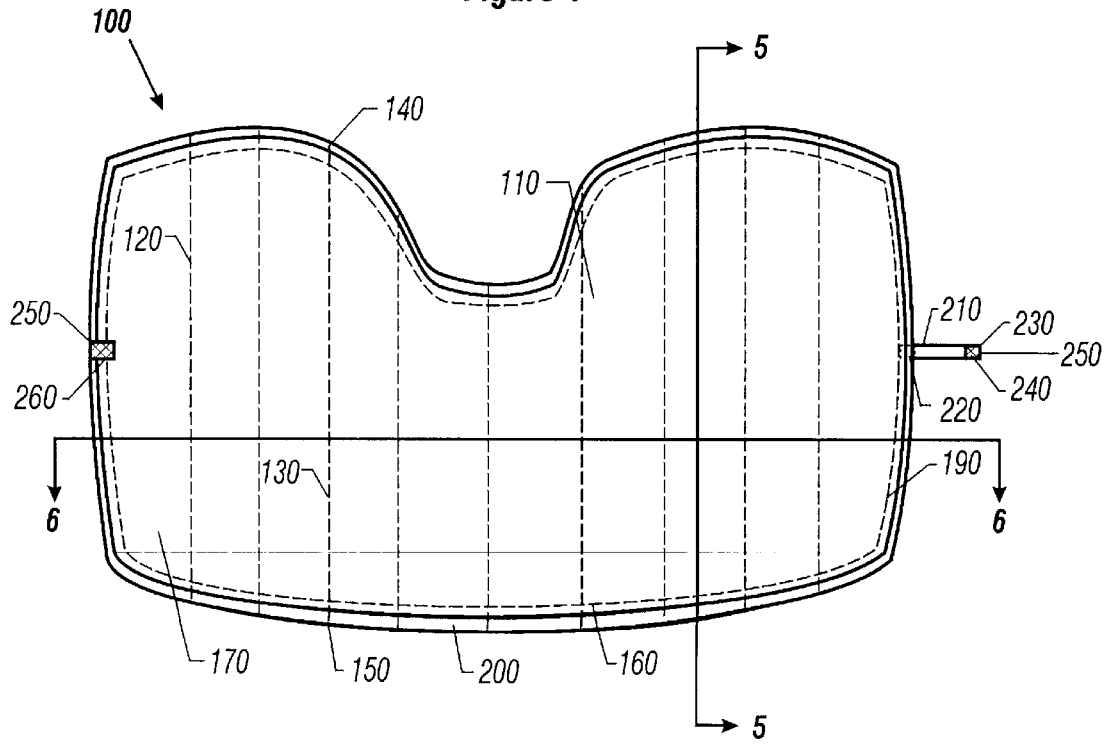
FIG. 2 is a perspective view of a vehicle sunshade in an open position.

Referring to FIG. 2, a perspective view is shown of a foldable sun shade 100 under the present invention that is in a completely extended, or open, position. The foldable sun shade 100 is divided into adjacent joined panels 110 by lines of stitching 120 through the core and the surface material located at each fold 130. These lines of stitching 120 located at each fold 130 extend vertically from one edge 140 to another edge 150 of the vehicle sunshade 100. The adjacent joined panels 110 are joined to each other through the folds 130 and the lines of stitching 120 between them.

A hinged margin 160 is located around the periphery of the sun shade 100. The hinged margin 160 enables the sunshade 100 to conform to the shape of a variety of vehicle windshield and dashboard shapes because it is hinged in the horizontal direction by the horizontal line of stitching 190 and it is hinged in the vertical direction by lines of stitching 120 and folds 130. This combination of hinges at the lines of stitching 120 and 190 allows the sunshade 100 to be shaped to fit irregularly shaped enclosures. Furthermore, the resiliency and flexibility of the materials of which the sunshade 100 is constructed allow the sunshade 100 to be shaped and reshaped without damage to the sunshade 100. In another embodiment, the vertical and horizontal lines of stitching 120 and 190 may be defined by pressure scoring.

A trimming material 200 may be applied to the edge of the sun shade 100 to prevent delamination of the surface material 170 from the polymer foam core 180 (not shown). The trimming material 200 may be affixed to the sun shade 100 by gluing or stitching, or a combination thereof. The trimming material 200 may also include a hem, ribbon or other fabric material attached at the edge of the sun shade.

A restraining strap 210 may be attached to the sunshade 100. The attached end 220 of the restraining strap 210 is affixed to the sunshade 100 by stitching, gluing, or laminating, or a combination thereof. The free end 230 of the restraining strap 210 features the first part 240 of an affixing system 250. The counterpart 260 to the affixing system 250 is attached at one end of the sunshade 100 opposite the end to which the restraining strap 210 is attached. When the sunshade 100 is in the closed state, the restraining strap 210 may be extended around the folded sunshade 100 and the two parts 240 and 260 of affixing system 250 may be attached together to maintain the sunshade 100 in the closed state. The affixing system 250 may include adhesive, tape, hook-and-loop, snaps, buttons, or any other mechanism capable of releasably attaching two pieces together.

Figure 3:
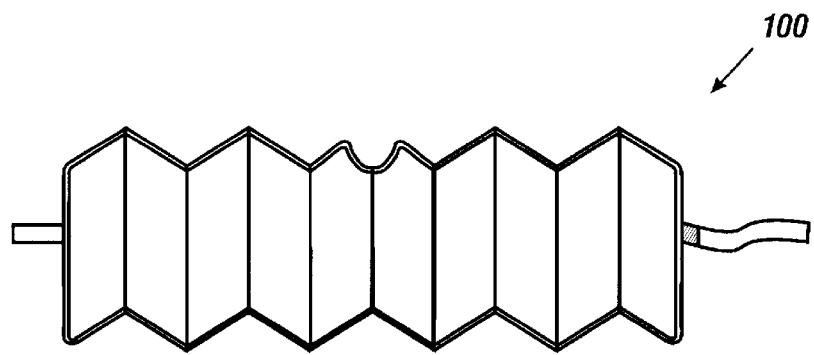
FIG. 3 is a perspective view of a vehicle sunshade in a partially open position.

Referring to FIG. 3, a perspective view is shown of a foldable sun shade 100 under the present invention that is in a partially open position.

Figure 4:
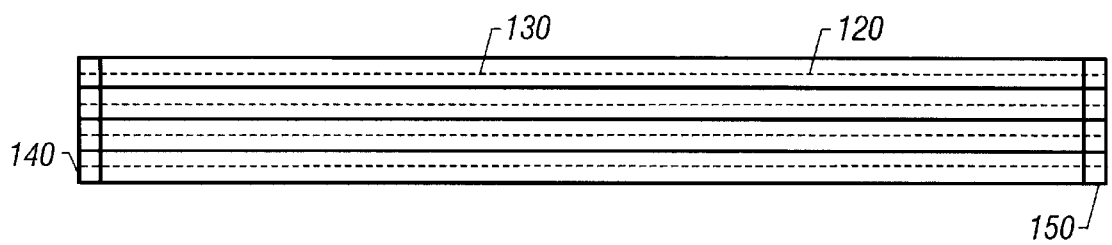
FIG. 4 is a perspective view of a vehicle sunshade in a closed position.

Referring to FIG. 4, a perspective view is shown of a foldable vehicle sun shade 100 under the present invention that is in a completely closed, or folded position. Each fold 130 is defined by line or lines of stitching 120 extending from one edge 140 of the foldable sun shade 100 to another edge 150 of the foldable sun shade 100.

Figure 5:
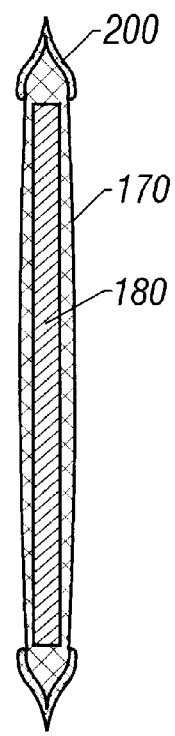
FIG. 5 is a vertical cross-section of a panel of the vehicle sunshade.

Referring to FIG. 5, a cross-sectional view is shown of a foldable vehicle sun shade 100 under the present invention. In general, the sun shade 100 comprises a polymer foam core 180 onto which a surface material 170 is affixed.

The polymer foam core 180 has a thickness from 2 mm to 7 mm, preferably 3 mm to 5 mm, and may be made of low or high density polyethylene foam or other materials, including materials suitable for insulating, such as polyurethane, as well as other polymeric and non-polymeric materials. Suitable resilient polymer foam core 180 materials include low or high density polyethylene foam, polyurethane foam, and other resilient, insulative materials. Thermal insulation increases with polymer foam core 180 thickness. The sunshade 100 obtains a semi-rigid, resilient nature from the polymer foam core 180.

The surface material 170 is affixed to the polymer foam core 180 by gluing, stitching, or laminating, or any combination thereof. In the context of this invention, laminating is defined as joining at least two layers together. Laminating can be accomplished by the use of heat or resin to affix at least two layers together. Sufficient resin should be used to affix the surface material 170 to the foam core 180 so the surface material 170 will not delaminate in the high temperature to which the foldable vehicle sun shade 100 is subjected during use. More than 20 to 25 microns of resin is required to accomplish this.

Suitable surface materials 170 may be made of nylon, PET, polyurethane-coated nylon, and other materials suitable for reflecting heat and light energy. Busch & Associated 70 denier nylon, Busch & Associated four-ply nylon, and polyethylene-terephalate (PET) film with a thickness greater than 0.05 mm, preferably 0.15 mm thick, have been proven applicable in the present invention. A nylon surface material may be coated with polyurethane. The surface material 170 may be affixed to the polymer core 180 by stitching, gluing, or heat laminating, or a combination thereof.

Other suitable surface materials 170 may include cotton, silk, taffeta, polyester, foil, paper, rayon, and cardboard or a combination thereof. Additionally, silver or clear polyurethane coating may serve as a suitable surface material 170.

Figure 6:
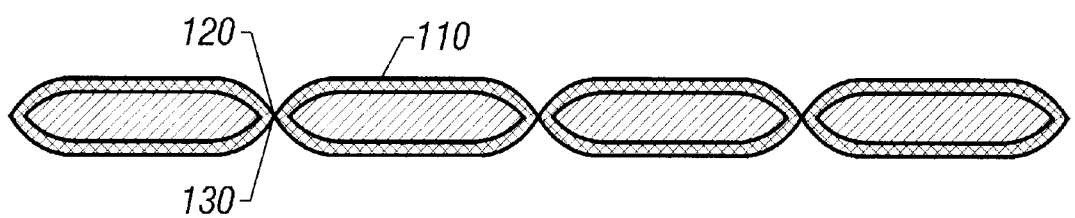
FIG. 6 is a perspective view of a horizontal cross-section of a vehicle sunshade.

Referring to FIG. 6, a horizontal cross-section of a foldable vehicle sunshade 100 is shown. The lines of stitching 120 at each fold 130 define, or outline, each foldably joined panel 110.

Figure 7:
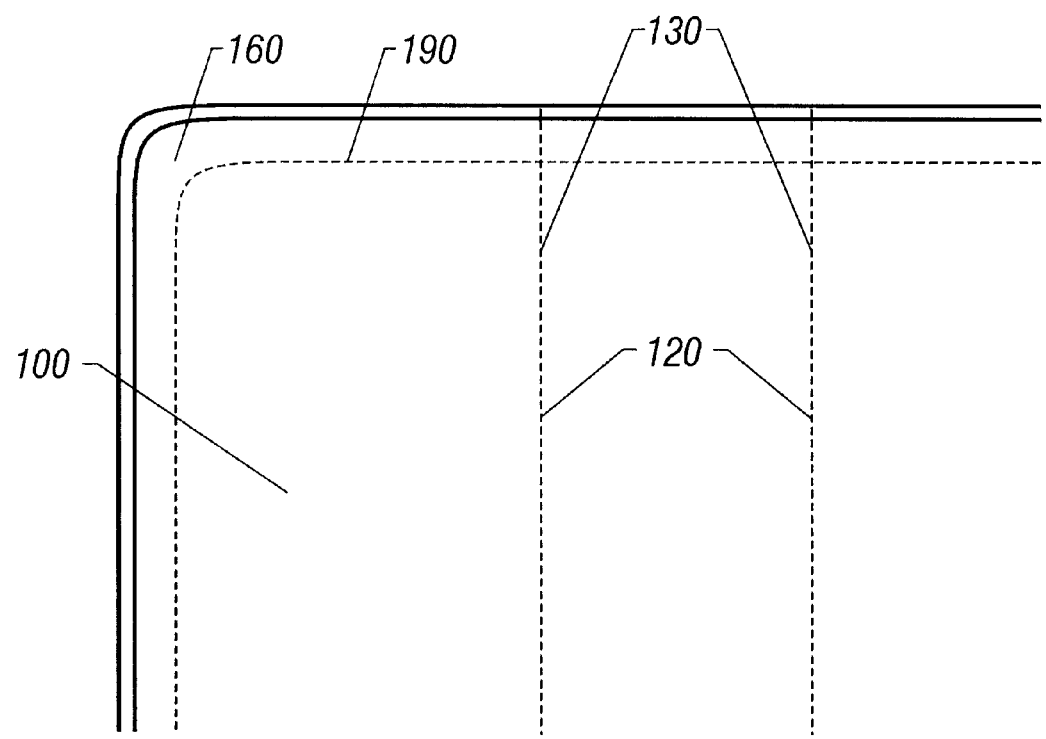
FIG. 7 is a perspective view of a hinged margin.

Referring to FIG. 7, a perspective view of a hinged margin 160 is provided. The margin 160 is hinged in the vertical direction by lines of stitching 120 and folds 130 and it is hinged in the horizontal direction by the horizontal line of stitching 190. This hinged margin 160 allows the sunshade 100 to conform to fit a variety of irregularly shaped vehicle windshields and dashboards.

Other embodiments are within the scope of the following claims. Although the present invention has been described with reference to specific exemplary embodiments, various modifications and variations may be made to these embodiments without departing from the spirit and scope of the invention as set forth in the claims.

What is claimed is:

1. A vehicle sunshade having foldably joined panels comprising a polyethylene terephthalate surface material affixed to a resilient polymer foam core material, wherein the resilient polymer core materials is selected from the group consisting of polyethylene and polyurethane, and the resilient polymer core material is capable of insulating heat and light radiation; and wherein the surface material is coated with a coating selected from the group consisting of polyurethane and polyethylene.

2. The vehicle sunshade of claim 1 wherein the resilient polymer foam core material has a thickness between 2 to 7 mm thick.

3. The vehicle sunshade of claim 1 wherein the foldable vehicle sunshade is so dimensioned as to be positionable under a vehicle windshield.

4. The vehicle sunshade of claim 1 further comprising a trimming material secured to an outer periphery of the sunshade.

5. The vehicle sunshade of claim 1 further comprising a hinged margin extending around an outer periphery of the sunshade.

6. The vehicle sunshade of claim 1 further comprising a restraining strap.

7. The vehicle sunshade of claim 1 wherein the surface material is affixed to the resilient polymer foam core material by gluing.

8. The vehicle sunshade of claim 1 wherein the surface material is affixed to the resilient polymer foam core material by stitching.

9. The vehicle sunshade of claim 8 wherein lines of stitching outline at least one edge of at least one of the foldably joined panels.

10. The vehicle sunshade of claim 8 wherein stitching affixes the resilient polymer foam core material and the surface material together and defines each foldably joined panel.

11. The vehicle sunshade of claim 1 wherein the surface material is affixed to the resilient polymer foam core material by laminating.

12. The vehicle sunshade of claim 1 wherein the surface material is affixed to the resilient polymer foam core material by any combination of gluing, stitching, and laminating.

13. A foldable panel assembly having at least four edges comprising:

- a polyethylene core, a polyethylene terephthalate surface material covering the core, and a polyurethane coated nylon surface material covering the core;
- a plurality of folds;
- a series of stitches extending from one edge to another edge positioned in each fold of the foldable panel;
- a hinged margin extending around an outer periphery of the panel; and
- a restraining strap,
- wherein the polyethylene core is capable of insulating heat and light radiation.

14. A foldable vehicle sunshade comprising:

- a plurality of panels, each comprising a polyethylene core, a polyethylene terephthalate surface material covering the core, and a polyurethane coated nylon surface material covering the core; and
- a connecting element joining each panel to another panel so that the sunshade may be extended from a folded state to an unfolded state and then returned to the folded state;
- a hinged margin extending around an outer periphery of the sunshade; and
- a restraining strap,
- wherein the polyethylene core is capable of insulating heat and light radiation.

15. A foldable vehicle sunshade comprising:

- a plurality of panels, each comprising a polyethylene core, and a polyethylene terephthalate surface material covering the core; and
- a connecting element joining each panel to another panel so that the sunshade may be extended from a folded state to an unfolded state and then returned to the folded state;
- a hinged margin extending around an outer periphery of the sunshade; and
- a restraining strap,
- wherein the polyethylene core is capable of insulating heat and light radiation; and wherein the surface material is coated with a coating selected from the group consisting of polyurethane and polyethylene.

* * * * *

UNITED STATES PATENT AND TRADEMARK OFFICE
CERTIFICATE OF CORRECTION

PATENT NO.    : 6,289,968 B1  
DATED         : September 18, 2001  
INVENTOR(S)   : Karten et al.

It is certified that error appears in the above-identified patent and that said Letters Patent is hereby corrected as shown below:

Title page,  
Item [56], FOREIGN PATENT DOCUMENTS, please delete "5676" and insert -- 5679 --.

Column 1,  
Line 32, please delete "terephalate" and insert -- terephthalate --.  
Line 47, after "foam" please insert a space.  
Line 47, please delete "terephalate" and insert -- terephthalate --.

Column 4,  
Line 8, please delete "terehalate" and insert -- terephthalate --.

Signed and Sealed this

Eighth Day of October, 2002

Attest:

JAMES E. ROGAN  
Attesting Officer        Director of the United States Patent and Trademark Office